(12) United States Patent
Horii (10) Patent No.: US 10,002,158 B2
(45) Date of Patent: *Jun. 19, 2018

(54) APPARATUS AND METHOD FOR PROCESSING A QUERY

(71) Applicant: International Business Machines Corporation, Armonk, NY (US)

(72) Inventor: Hiroshi Horii, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/377,546

(22) Filed: Dec. 13, 2016

(65) Prior Publication Data

US 2017/0091261 A1    Mar. 30, 2017

Related U.S. Application Data

(63) Continuation of application No. 14/931,760, filed on Nov. 3, 2015.

(30) Foreign Application Priority Data

Nov. 4, 2014    (JP) .................................. 2014-224424

(51) Int. Cl.
  *G06F 17/30*        (2006.01)
(52) U.S. Cl.
  CPC .. *G06F 17/30371* (2013.01); *G06F 17/30377* (2013.01); *G06F 17/30979* (2013.01)
(58) Field of Classification Search
  CPC ......... G06F 17/30371; G06F 17/30979; G06F 17/30377
  See application file for complete search history.

(56) References Cited

U.S. PATENT DOCUMENTS

2008/0262999 A1    10/2008   Helsen et al.

FOREIGN PATENT DOCUMENTS

| JP | H05289921 A | 11/1993 |
| JP | 2009026334 A | 2/2009 |

(Continued)

OTHER PUBLICATIONS

Peng, Largescale incremental processing using distributed transactions and notifications, pp. 1-14, 2010.*

(Continued)

*Primary Examiner* — Albert M Phillips, III
(74) *Attorney, Agent, or Firm* — Nathan M. Rau (57) ABSTRACT

Apparatus and method for processing a query. The apparatus includes: a storage unit configured to store (i) a plurality of safe elements committed and saved in the database, and (ii) a plurality of unsafe elements for updating the plurality of safe elements, wherein the unsafe elements are not committed or committed, but not saved; a first query executing unit configured v to execute the query on the plurality of unsafe elements; a second query executing unit configured to execute the query on the plurality of safe elements after the first query executing unit executes the query; and a third query executing unit configured to execute the query on at least one safe element saved during execution of the query by the second query executing unit after the second query executing unit executes the query. There is also provided another apparatus and a method.

12 Claims, 9 Drawing Sheets

(56) References Cited

FOREIGN PATENT DOCUMENTS

| JP | 2013033345 A | 2/2013 |
|----|--------------|--------|
| JP | 5967628 B2 | 8/2016 |
| WO | 2011099082 A1 | 8/2011 |

OTHER PUBLICATIONS

Peng et al., "Large-scale Incremental Processing Using Distributed Transaction and Notifications," Proceedings of the 9th USENIX Symposium on Operating Systems Design and Implementaion, USENIX, 2014, 4 pages. https://www.usenix.org/legacy/events/osdi10/tech/full_papers/Peng.pdf/.
Rystsov, D., "Mongodb-Transaction-Example," GitHub, Aug. 12, 2013, 4 pages. https://github.com/rystsov/mongodb-transaction-example/.
Decision to Grant a Patent, JP Patent Application No. 2014-224424, dated Jun. 7, 2016, 6 pages.
List of IBM Patents or Patent Applications Treated as Related, Signed Dec. 13, 2016, 2 pages.
Techopedia, Commit definition, Apr. 15, 2011, p. 1.
Kantere, "Distributed Triggers for Peer Data Management," OTM 2006, LNCS 4275, pp. 17-35.
Stolfo, "JAM: Java Agents for Meta-Learning over Distributed Databases," KDD97 Proceedings, 1997, 8 pages.
Anderson et al., "CouchDB the Definitive Guide," 2010, 15 pages.

* cited by examiner

{ _id: k1,
  value1: 10,
  value2: 12,
  _dirty : {
    value1: 0,
    value2: 12 },
  _txId : Tx1
}

{ _id: k2,
  value1: 30,
  _dirty : {
    value1: -5},
  _txId : Tx2
}

{ _id: k3,
  value1: -10,
  value2: 12,
  _dirty : {
    value1: 10,
    value2: 12 },
  _txId : Tx2
}

{ _id: k4,
  value1: 0,
  value2: 12,
  _dirty : {
    value1: 10,
    value2: 12 },
  _txId : Tx3
}

{ _id: k5,
  value1: 5,
  value2: 12,
  _dirty : {
    value1: 10,
    value2: 12 },
  _txId : Tx
}

{ _id: k6,
  value1: 10,
  value2: 3,
  _dirty : {
    value1: -10,
    value2: 3 },
  _txId : Tx3
}

APPARATUS AND METHOD FOR PROCESSING A QUERY

CROSS-REFERENCE TO RELATED APPLICATION

This application claims priority under 35 U.S.C. § 119 from Japanese Patent Application No. 2014-224424 filed Nov. 4, 2014, the entire contents of which are incorporated herein by reference.

TECHNICAL FIELD OF THE INVENTION

The present invention relates to an apparatus and a method for processing a query, more particularly, to an apparatus and a method for processing a query for a NoSQL database.

BACKGROUND OF THE INVENTION

A technique of implementing a transaction function on the NoSQL database which does not support transaction has been known. For example, the Non-patent Literature Large-scale Incremental Processing Using Distributed Transactions and Notifications discloses a percolator which is a system for sequentially updating a large data set. In addition, the Non-patent Literature MongoDB transaction example discloses adding an "updated" field which indicates a version of an object changed during transaction, to a model including a "value" field.

It should be noted that a technique of managing a state of transaction is also known as a technique disclosed in the prior art. For instance, Japanese Patent JP05-289921A discloses a technique of storing update data to which commitment information different for each transaction is added in response to a request for updating a database, eliminating commitment information from update data to be committed in response to a commitment request, searching committed data in response to a request for display from a user, searching update data before the commitment and in the transaction, searching update data before the commitment and in other transaction, and outputting these search results to a display apparatus using display methods different from each other.

Also, Japanese Patent JP2009-26334A discloses a technique of providing a plurality of data holding means for insertion and a plurality of data holding means for deletion, the data holding means for insertion and the data holding means for deletion performing processing of changing data at high speed, and data holding unit managing means holding classification of unused, being used, committed, and being transferred, along with identifiers of corresponding transaction for the data holding means for insertion and the data holding means for deletion.

Further, Japanese Patent JP2013-33345A discloses a technique of preparing a management map in which a key is a global transaction ID, and a value is {a state of transaction, a global transaction ID of transaction for which end is waited}, starting local transaction for management on a server which manages the key of the management map during process of starting global transaction, and starting local transaction for waiting for release of a lock on the server which manages the key of the management map during process for waiting for end of the global translation, so as to wait for end of competing transaction.

International Application WO2011/099082 discloses a technique in which a first storage unit stores a log of updating processing through transaction, a second storage unit stores update information indicating that data has been updated in association with a transaction ID when an updating unit updates the data, and a restoring unit determines whether or not update information of data to be searched exists in the second storage unit when a searching unit performs search, and, if the update information exists, reads out transaction which has updated the data from the first storage unit and performs restoration processing of the data.

SUMMARY OF THE INVENTION

Implementation of a transaction function on the NoSQL database is publicly known. However, while the prior art techniques provide a function of returning a value corresponding to a primary key, these techniques do not support complicated queries such as a query for returning a value that matches conditions. Further, there is a problem that when a query is executed only on the "value" field, and the latest data cannot be extracted.

The present invention provides an apparatus for processing a query for a NoSQL database. The apparatus includes: a storage unit configured to store (i) a plurality of safe elements committed and saved in the database, and (ii) a plurality of unsafe elements for updating the plurality of safe elements, wherein the unsafe elements are not committed or committed, but not saved; a first query executing unit configured to execute the query on the plurality of unsafe elements; a second query executing unit configured to execute the query on the plurality of safe elements after the first query executing unit executes the query; and a third query executing unit configured to execute the query on at least one safe element saved during execution of the query by the second query executing unit after the second query executing unit executes the query.

Further, the present invention provides an apparatus for processing a query for a NoSQL database. The apparatus includes: a storage unit configured to store (i) a plurality of safe elements committed and saved in the database, (ii) a plurality of unsafe elements for updating the plurality of safe elements, the unsafe elements being not committed or committed but not saved, and (iii) a plurality of pieces of identification information for identifying a plurality of transactions relating to updating the plurality of safe elements with the plurality of unsafe elements in association with one another; a first query executing unit configured to execute the query on the plurality of unsafe elements, and to include in a result of the query, a specific unsafe element extracted using the query among the plurality of unsafe elements if a state of transaction identified by the identification information among the plurality of pieces of identification information stored in association with the specific unsafe element satisfies predetermined conditions; a second query executing unit configured to execute the query on the plurality of safe elements after the first query executing unit executes the query, and to include in a result of the query, a specific safe element extracted using the query among the plurality of safe elements if a state of transaction identified by the identification information among the plurality of pieces of identification information stored in association with the specific safe element satisfies predetermined conditions; and a third query executing unit configured to execute the query on at least one safe element saved during execution of the query by the second query executing unit after the second query executing unit executes the query, and to include in a result of the query, a specific safe element extracted using the query among the at least one safe element if a state of transaction identified by the identification information among the plurality of pieces of identification information stored in association with the specific safe element satisfies predetermined conditions.

Further, the present invention provides a computer-implemented method for processing a query for a NoSQL database in an apparatus including a storage unit arranged to store a plurality of safe elements committed and saved in the database, and a plurality of unsafe elements for updating the plurality of safe elements, the unsafe elements being not committed or committed but not saved. The method includes: executing the query on the plurality of unsafe elements; executing the query on the plurality of safe elements after the query is executed on the plurality of unsafe elements; and executing the query on at least one safe element saved during execution of the query on the plurality of safe elements after the query is executed on the plurality of safe elements.

Still further, the present invention provides a program for causing a computer to function as an apparatus for processing a query for a NoSQL database, which causes the computer to function as a storage unit arranged to store a plurality of safe elements committed and stored in the database, and a plurality of unsafe elements for updating the plurality of safe elements, the unsafe elements being not committed or committed but not saved, a first query executing unit arranged to execute a query on the plurality of unsafe elements, a second query executing unit arranged to execute a query on the plurality of safe elements after the query is executed by the first query executing unit, and a third query executing unit arranged to execute a query on at least one safe element saved while the query is executed by the second query executing unit after the query is executed by the second query executing unit.

According to the present invention, it is possible to implement a transaction function on a NoSQL database and extract the latest data using a query.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION OF PREFERRED EMBODIMENTS

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Transaction of atomically updating a plurality of entries can be also implemented in a NoSQL database in which only atomically updating one entry is guaranteed. The transaction can be implemented without changing the existing NoSQL database by saving a transaction state such as "being executed", "committed" and "aborted" and data which is not committed or which is committed but not saved as committed data (hereinafter referred to as "in-flight data") in the NoSQL database.

Specifically, the transaction can be implemented by executing the following steps. In the first step, a transaction state of "being executed" is saved for a transaction ID of identifying the transaction when the transaction is started. In the second step, data used by the transaction for update is saved in the NoSQL database as the in-flight data along with the transaction ID. In the third step, a transaction state of the transaction ID is overwritten to be "committed" when the transaction is committed. In the fourth step, the in-flight data is saved as committed data.

Extraction of the latest data by executing a query for such a NoSQL database will be studied. Note that the query as described below will be used. That is, first, the query does not support join processing. In other words, there is no query which designates relation among a plurality of entries. Second, a query specifying an element in addition to a key is supported. In other words, queries more than in those of Key-Value Store (KVS) can be executed.

For example, a MongoDB provides a function of executing a query only on committed data. However, as described above, if in-flight data is saved in the NoSQL database, the in-flight data is required to be processed according to transaction states. Even if the in-flight data is committed, there is a case where the in-flight data is not saved as committed data due to a failure at a client, or the like. That is, there is a case where the above-described fourth step is not executed. In this case, it is impossible to judge whether the in-flight data is not committed, or committed but not saved as committed data. Therefore, data which is committed but not saved as committed data cannot be extracted using a query. As a result, when the in-flight data is saved in the NoSQL database, the query function provided by the MongoDB cannot be utilized.

FIGS. 1(a) to 1(f) illustrate aspects where a query is executed only on committed data. Here, in each entry, "_id" indicates a key, and subsequent "value1" and "value2" indicate committed data. Further, following subsequent "_dirty", "value1" and "value2" indicate in-flight data, and "_txId" indicates a transaction ID. Further, a transaction state of "being executed" is held for a transaction ID of "Tx1", a transaction state of "committed" is held for a transaction ID of "Tx2", and a transaction state of "aborted" is held for a transaction ID of "Tx3". FIGS. 1(a) to 1(f) illustrate aspects where the transaction of "Tx" is running a query of {value1:{$gt:0}}.

It should be noted that the query is described according to the notation of the MongoDB query language. That is, "{value1:{$gt:0}}" means that entries having a value of value1 greater than "0" in the committed data (surrounded with thick frames) are extracted.

Figure 1A:
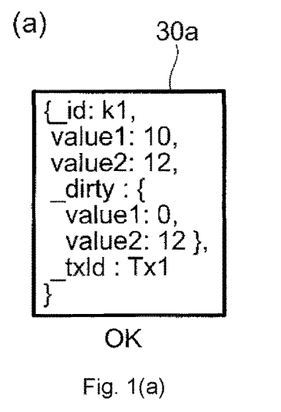
FIGS. 1(a)-(f) illustrate aspects where a query is executed only on committed data.

In FIG. 1(a), the transaction ID of "Tx1" is held in an entry 30a, the transaction state of "being executed" is held for this transaction ID. Therefore, because the latest data is committed data, and the value of value1 in the committed data is "10" which is greater than "0", the entry 30a should be included in a query result. Also when a query is executed only on committed data, because the value of value1 in the committed data is "10" which is greater than "0", the entry 30a is included in the query result. Accordingly, a problem does not arise in the query result for this entry 30a.

Figure 1B:
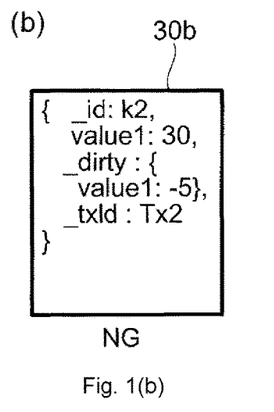

In FIG. 1(b), a transaction ID of "Tx2" is held in an entry 30b, and a transaction state of "committed" is held for this transaction ID. Therefore, because the latest data is in-flight data, and the value of value1 in the in-flight data is "-5", which is not greater than "0", the entry 30b should not be included in a query result. However, if the query is executed only on committed data, because the value of value1 in the committed data is "10" which is greater than "0", the entry 30b is included in the query result. Accordingly, a problem arises for this entry 30b that the query result does not reflect data which should have been committed by the transaction.

Figure 1C:
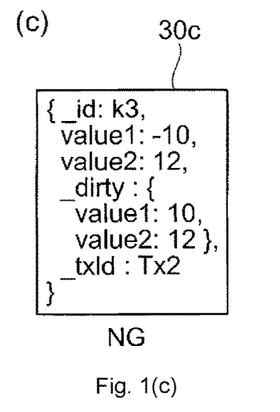

In FIG. 1(c), a transaction ID of "Tx2" is held in an entry 30c, and a transaction state of "committed" is held for this transaction ID. Therefore, because the latest data is in-flight data, and the value of value1 in the in-flight data is "10" which is greater than "0", the entry 30c should be included in a query result. However, if the query is executed only on committed data, because the value of value1 in the committed data is "-10" which is not greater than "0", the entry 30c is not included in the query result. Accordingly, a problem arises for this entry 30c that the query result does not reflect data which should have been committed by the transaction.

Figure 1D:
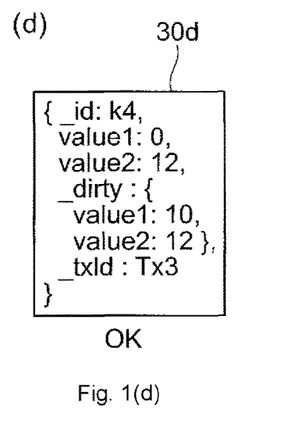

In FIG. 1(d), a transaction ID of "Tx3" is held in an entry 30d, and a transaction state of "aborted" is held for this transaction ID. Therefore, because the latest data is committed data, and the value of value1 in the committed data is "0" which is not greater than "0", the entry 30d should not be included in a query result. However, if the query is executed only on the committed data, because the value of value1 in the committed data is "0" which is not greater than "0", the entry 30d is not included in the query result. Accordingly, a problem does not arise in the query result for this entry 30d.

Figure 1E:
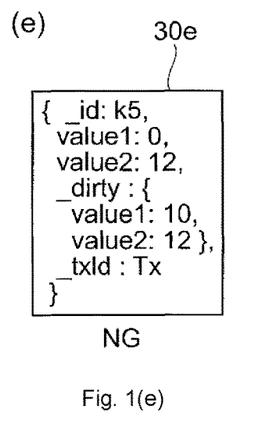

In FIG. 1(e), a transaction ID of "Tx" is held in an entry 30e, and transaction of this transaction ID is transaction running a query. Therefore, because the latest data is in-flight data, and the value of value1 in the in-flight data is "10" which is greater than "0", the entry 30e should be included in a query result. However, if the query is executed only on committed data, because the value of value1 in the committed data is "0" which is not greater than "0", the entry 30e is not included in the query result. Accordingly, a problem arises for this entry 30e that the query result does not reflect data updated by the transaction executing the query.

Figure 1F:
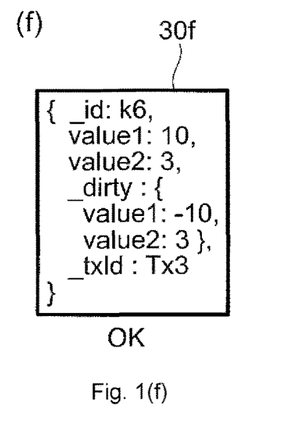

In FIG. 1(f), a transaction ID of "Tx3" is held in an entry 30f, and a transaction state of "aborted" is held for this transaction ID. Therefore, because the latest data is committed data, and the value of value1 in the committed data is "10" which is greater than "0", the entry 30f should be included in a query result. Also, when the query is executed only on committed data, the value of value1 in the committed data is "10" which is greater than "0", the entry 30f is included in the query result. Accordingly, a problem does not arise in the query result for this entry 30f.

In this embodiment of the present invention, the latest data at the time at which a query is executed, or the latest data after the time, is returned as a query result. In order to achieve this, committed data (Committed Data) and in-flight data (In-Flight Data) are held for each entry which can be atomically updated, and the query is executed sequentially on the in-flight data, the committed data, and data committed and saved during execution of the query in this order. Execution of the query on each of these data will be described below for each of a first phase, a second phase, and a third phase.

The first phase is a phase in which the query is executed on the in-flight data. In this phase, the query of {value1: {$gt:0}} is converted into a query of {_dirty.value1:{$gt: 0}} by a prefix of "_dirty" being added thereto, and the converted query is executed.

FIGS. 2(a) to 2(f) illustrate aspects of processing in a first phase where a query is executed on in-flight data. First, entries having a value of value1 in the in-flight data greater than "0" are extracted using the above-described converted query. In FIGS. 2(a) to 2(f), the entries extracted here are surrounded with thick frames.

Figure 2A:
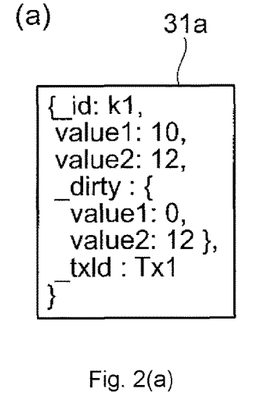
FIGS. 2(a)-(f) illustrate aspects of processing in a first phase where a query is executed on in-flight data.
Figure 2B:
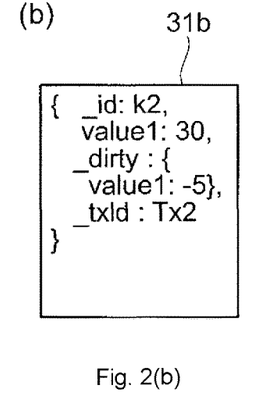
Figure 2C:
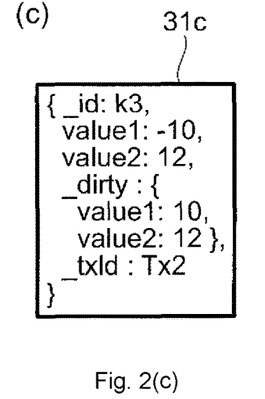
Figure 2D:
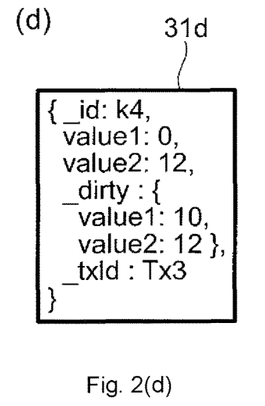
Figure 2E:
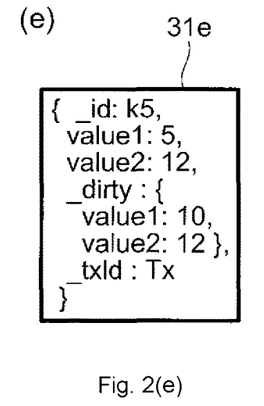
Figure 2F:
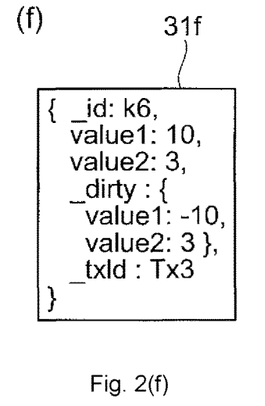

The entries 31a of FIG. 2(a), 31b of FIG. 2(b), and 31f of FIG. 2(f) are not extracted. This is because the value "0" of value1 in the in-flight data of the entry 31a in FIG. 2(a), the value "-5" of value1 in the in-flight data of the entry 31b in FIG. 2(b) and the value "-10" of value1 in the in-flight data of the entry 31f in FIG. 2(f) is greater than "0".

However, the value "10" of value1 in the in-flight data of the entry 31c in FIG. 2(c), the value "10" of value1 in the in-flight data of the entry 31d in FIG. 2(d), and the value "10" of value1 in the in-flight data of the entry 31e in FIG. 2(e) are greater than "0". Therefore, the entries 31c, 31d and 31e are extracted. Processing according to the transaction state is performed on the extracted entries 31c, 31d and 31e.

In FIG. 2(e), a transaction ID of "Tx" is held in the entry 31e, and transaction of this transaction ID is transaction which is running a query. Therefore, because in-flight data in the entry 31e is the latest data, the entry 31e is added to the query result.

In FIG. 2(c), a transaction ID of "Tx2" is held in the entry 31c, and a transaction state of "committed" is held for this transaction ID. Therefore, in-flight data in the entry 31c is converted into committed data.

In FIG. 2(d), a transaction ID of "Tx3" is held in the entry 31d, and a transaction state of "aborted" is held for this transaction ID. Therefore, because in-flight data in the entry 31d is not the latest data, the in-flight data in the entry 31d is not added to the query result.

The second phase is a phase in which a query is executed on the committed data. In this phase, a query {value1:{$gt: 0}} is executed as is.

FIGS. 3(a) to 3(f) illustrate aspects of the processing in a second phase where a query is executed on committed data. First, entries having a value of value1 in the committed data greater than "0" are extracted using the above-described query. In FIGS. 3(a) to 3(f), the entries extracted here are surrounded with thick frames.

Figure 3A:
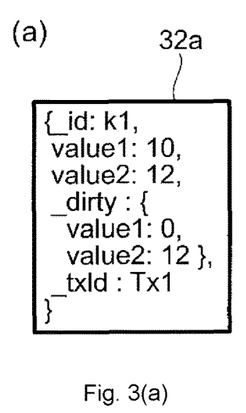
FIGS. 3(a)-(f) illustrate aspects of processing in a second phase where a query is executed on committed data.
Figure 3B:
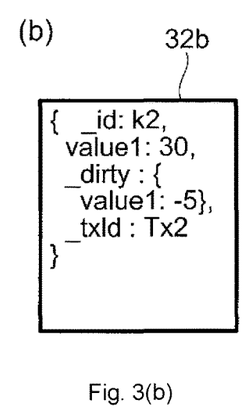
Figure 3C:
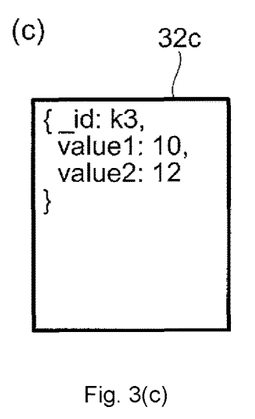
Figure 3D:
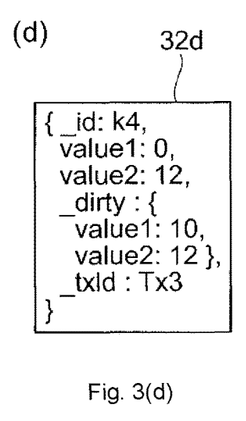

Entry 32d of FIG. 3(d) is not extracted because the value "0" of value1 in the committed data of the entry 32d is not greater than "0".

Figure 3E:
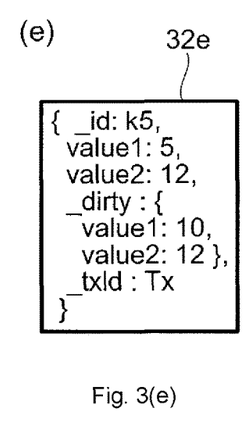
Figure 3F:
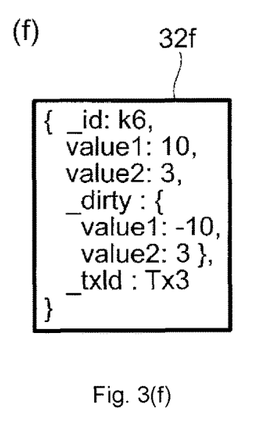

However, the value "10" of value1 in the committed data of the entry 32a in FIG. 3(a), the value "30" of value1 in the committed data of the entry 32b in FIG. 3(b), the value "5" of value1 in the committed data of the entry 32e in FIG. 3(e), and the value "10" of value1 in the committed data of the entry 32f in FIG. 3(f) are greater than "0", so the entries 32a, 32b, 32e and 32f are extracted. Further, the committed data of the entry 32c in FIG. 3(c) is replaced with the in-flight data of the entry 31c from FIG. 2(c), and because the value "10" of value1 in the committed data is greater than "0", the entry 32c is also extracted. Processing according to the transaction state is performed on the extracted entries 32a, 32b, 32c, 32e, and 32f.

In FIG. 3(c), in-flight data is not held in the entry 32c. Therefore, because the committed data in the entry 32c is the latest data, the entry 32c is added to the query result.

In FIG. 3(e), a transaction ID of "Tx" is held in the entry 32e, and transaction of this transaction ID is transaction which is running a query. Therefore, because while a transaction state of "being executed" is held for this transaction ID, the committed data in the entry 32e is not the latest data, the committed data in the entry 32e is not added to the query result.

In FIG. 3(b), a transaction ID of "Tx2" is held in the entry 32b, and a transaction state of "committed" is held for this transaction ID. Therefore, in-flight data in the entry 32b is converted into the committed data, and a key of the entry 32b is saved.

In FIG. 3(f), a transaction ID of "Tx3" is held in the entry 32f, and a transaction state of "aborted" is held for this transaction ID. Therefore, because committed data in the entry 32f is the latest data, the entry 32f is added to the query result.

In FIG. 3(a), a transaction ID of "Tx1" is held in the entry 32a, and a transaction state of "being executed" is held for this transaction ID. Further, transaction of this transaction ID is not running a query. Therefore, because the committed data in the entry 32a is the latest data, the entry 32a is added to the query result.

The third phase is a phase in which the same query as that of the second phase is executed again on the committed data corresponding to the key saved in the second phase. In this phase, the query {value1:{$gt:0}} is converted into a query {value1:{$gt:0}, id:{$in,[k2]}} by one more conditions of "_id:{$in,[k2]}" being added, and the converted query is executed. It should be noted that the second conditions of "id:{$in,[k2]}" mean that the value of "_id" is included in values enumerated in H.

Figure 4A:
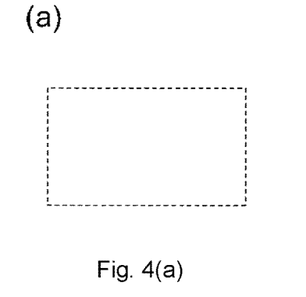
FIGS. 4(a)-(f) illustrate aspects of processing in a third phase where the same query as that of the second phase is executed again on the committed data corresponding to a key stored in the second phase.
Figure 4B:
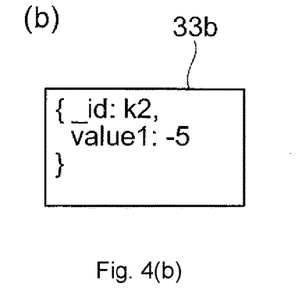
Figure 4C:
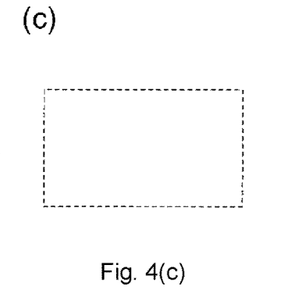
Figure 4D:
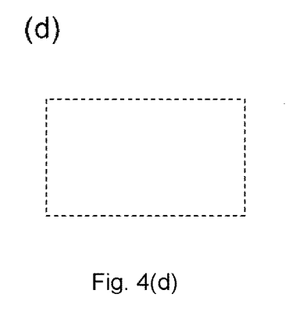
Figure 4E:
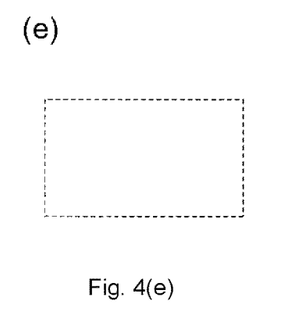
Figure 4F:
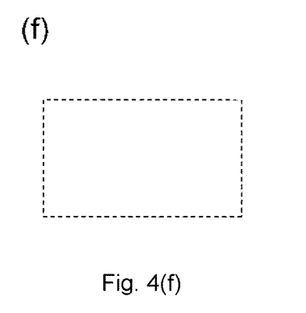

FIGS. 4(a) to 4(f) illustrate aspects of the processing in a third phase where the same query as that of the second phase is executed again on the committed data corresponding to a key stored in the second phase. In the third phase, only the entry 33b of FIG. 4(b) becomes a target by the above-described second conditions of the query. In the figure, this is indicated by surrounding the entries of FIGS. 4(a), and 4(c) to 4(f) with dashed line. However, because the values "−5" of value1 in the committed data of the entry 33b in FIG. 4(b) is not greater than "0", the entry 33b is not eventually extracted.

To address this, it is temporarily assumed that the above-described second conditions of the query are changed to be "_id: {$in,[k1,k2,k3,k4,k6]}", and accordingly the entries 32a to 32d and 32f in FIGS. 3(a) to 3(d) and 3(f) become a target for the processing of the third phase. It should be noted that, at this time, the in-flight data should be converted into the committed data in all of the entries 32a to 32d and 32f in FIGS. 3(a) to 3(d) and 3(f) when the query of the second phase is executed. However, there is a case where the in-flight data as in FIGS. 3(a), 3(b), 3(d) and 3(f) is held again by transaction processing after execution of the query of the second phase. Further, k5 is excluded from the above-described second conditions of the query because transaction which is the same as the transaction that is running the query does not generate in-flight data after the transaction is committed. The third phase will be described below focusing attention on the entries 32a to 32d and 32f in FIGS. 3(a) to 3(d) and 3(f).

In the third phase, entries having the value of value1 in the committed data greater than "0" are extracted using the above-described query. Also here, entries surrounded with thick frames are extracted entries.

That is, because the value "0" of value1 in the committed data of the entry 32d in FIG. 3(d) is not greater than "0", the entry 32d is not extracted.

However, because the value "10" of value1 in the committed data of the entry 32a in FIG. 3(a), the value "30" of value1 in the committed data of the entry 32b in FIG. 3(b), the value "10" of value1 in the committed data of the entry 32c in FIG. 3(c), and the value "10" of value1 in the committed data of the entry 32f in FIG. 3(f) are greater than "0", the entries 32a, 32b, 32c and 32f are extracted. Processing according to the transaction state is performed on the extracted entries 32a, 32b, 32c and 32f.

In FIG. 3(c), in-flight data is not held in the entry 32c. Therefore, because the committed data in the entry 32c is the latest data, the entry 32c is added to the query result.

In FIG. 3(b), a transaction ID of "Tx2" is held in the entry 32b, and a transaction state of "committed" is held for this transaction ID. Therefore, in-flight data in the entry 32b is converted into committed data, and a key of the entry 32b is saved. The third phase is executed again on this entry 32b.

In FIG. 3(f), a transaction ID of "Tx3" is held in the entry 32f, and a transaction state of "aborted" is held for this transaction ID. Therefore, because committed data in the entry 32f is the latest data, the entry 32f is added to the query result.

In FIG. 3(a), a transaction ID of "Tx1" is held in the entry 32a, and a transaction state of "being executed" is held for this transaction ID. Therefore, because committed data in the entry 32a is the latest data, the entry 32a is added to the query result.

Figure 5:
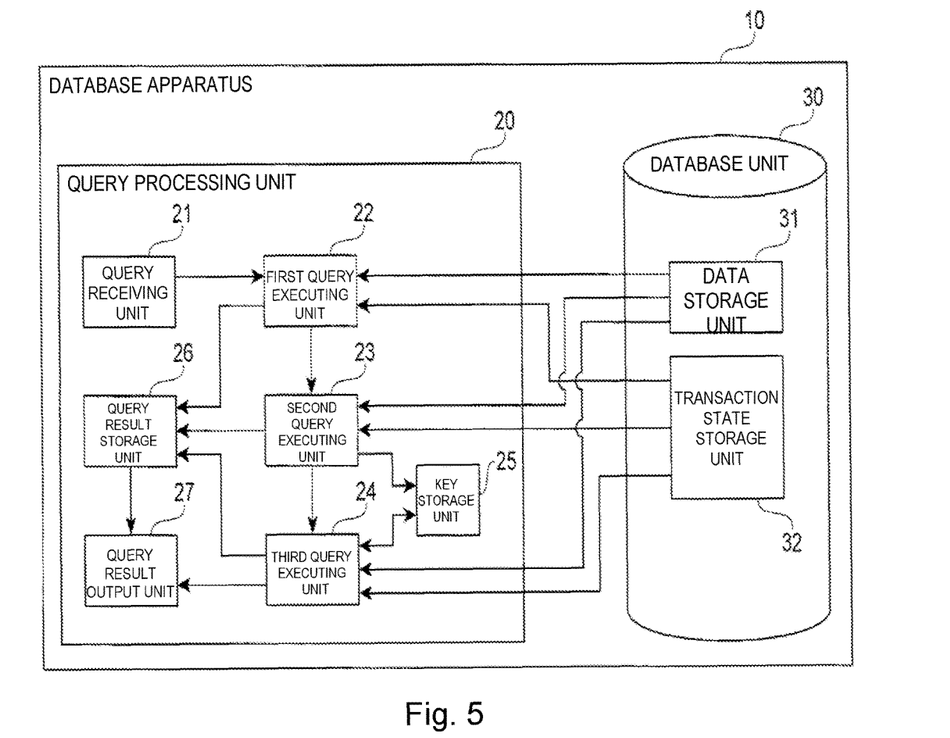
FIG. 5 illustrates an example of a functional structure of a database apparatus according to an embodiment of the present invention.

FIG. 5 illustrates an example of a functional structure of database apparatus 10 according to an embodiment of the present invention. As illustrated in the figure, database apparatus 10 includes query processing unit 20 and database unit 30. Query processing unit 20 includes: query receiving unit 21, first query executing unit 22, second query executing unit 23, third query executing unit 24, key storage unit 25, query result storage unit 26 and query result output unit 27. Further, database unit 30 includes: data storage unit 31 and transaction state storage unit 32.

Query receiving unit 21 receives a query issued by, for example, a client. First query executing unit 22 executes the query received by query receiving unit 21 on in-flight data held in a target entry in data storage unit 31. First query executing unit 22 then obtains a query result based on whether or not transaction which is updating each entry is the same as transaction which is running the query, and a transaction state of each entry stored in transaction state storage unit 32, and stores the query result in query result storage unit 26. At that time, if the transaction state of a given entry is "committed", in-flight data held in the entry is converted into committed data. In an embodiment of the present invention, in-flight data is used as an example of an unsafe element which is not committed, or which is committed but not saved, and first query executing unit 22 is provided as an example of a first query executing unit that executes a query on a plurality of unsafe elements.

Second query executing unit 23 executes the query received by query receiving unit 21 on the committed data held in a target entry in data storage unit 31. Second query executing unit 23 then obtains a query result based on whether or not there is transaction which is updating each entry, whether or not the transaction which is updating each entry is the same as transaction which is running the query, and a transaction state of each entry stored in transaction state storage unit 32, and stores the query result in query result storage unit 26. At this time, if the transaction state of a given entry is "committed", in-flight data held in the entry is converted into committed data, and a key of the entry is stored in key storage unit 25. In an embodiment of the present invention, the committed data is used as an example of a safe element which is committed and saved, and second query executing unit 23 is provided as an example of a second query executing unit which executes a query on a plurality of safe elements.

Third query executing unit 24 determines whether or not a key is stored in key storage unit 25. If a key is stored in key storage unit 25, third query executing unit 24 executes the query received by query receiving unit 21 on the committed data held in the entry which holds the key, and then performs the same processing as that of second query executing unit 23. Further, if a key is not stored in key storage unit 25, third query executing unit 24 notifies query result output unit 27 that the processing is finished. In an embodiment of the present invention, the committed data held in the entry which holds a key is used as an example of at least one safe element saved during execution of the query by the second query executing unit, and third query executing unit 24 is provided as an example of a third query executing unit which executes a query on at least one safe element.

Key storage unit 25 stores a key of an entry to be read out by third query executing unit 24, the entry being provided from second query executing unit 23 or third query executing unit 24 when second query executing unit 23 or third query executing unit 24 converts the in-flight data held in the entry into committed data.

Query result storage unit 26 stores the query result obtained by first query executing unit 22, the query result obtained by second query executing unit 23 and the query result obtained by third query executing unit 24.

Query result output unit 27 outputs the query result stored in query result storage unit 26 to outside when query result output unit 27 is notified from third query executing unit 24 that the processing is finished.

Data storage unit 31 stores data which becomes a target of query processing by query processing unit 20. Specifically, data storage unit 31 stores an entry as data, and a key, committed data, in-flight data and a transaction ID are held in each entry as described above. In an embodiment of the present invention, data storage unit 31 is provided as an example of a storage unit which stores a plurality of safe elements and a plurality of unsafe elements.

Transaction state storage unit 32 stores the transaction ID and a transaction state which is a state of transaction identified by the transaction ID, in association with each other. Here, the transaction state includes, "being executed", "committed", "aborted", or the like, as described above.

Figure 6:
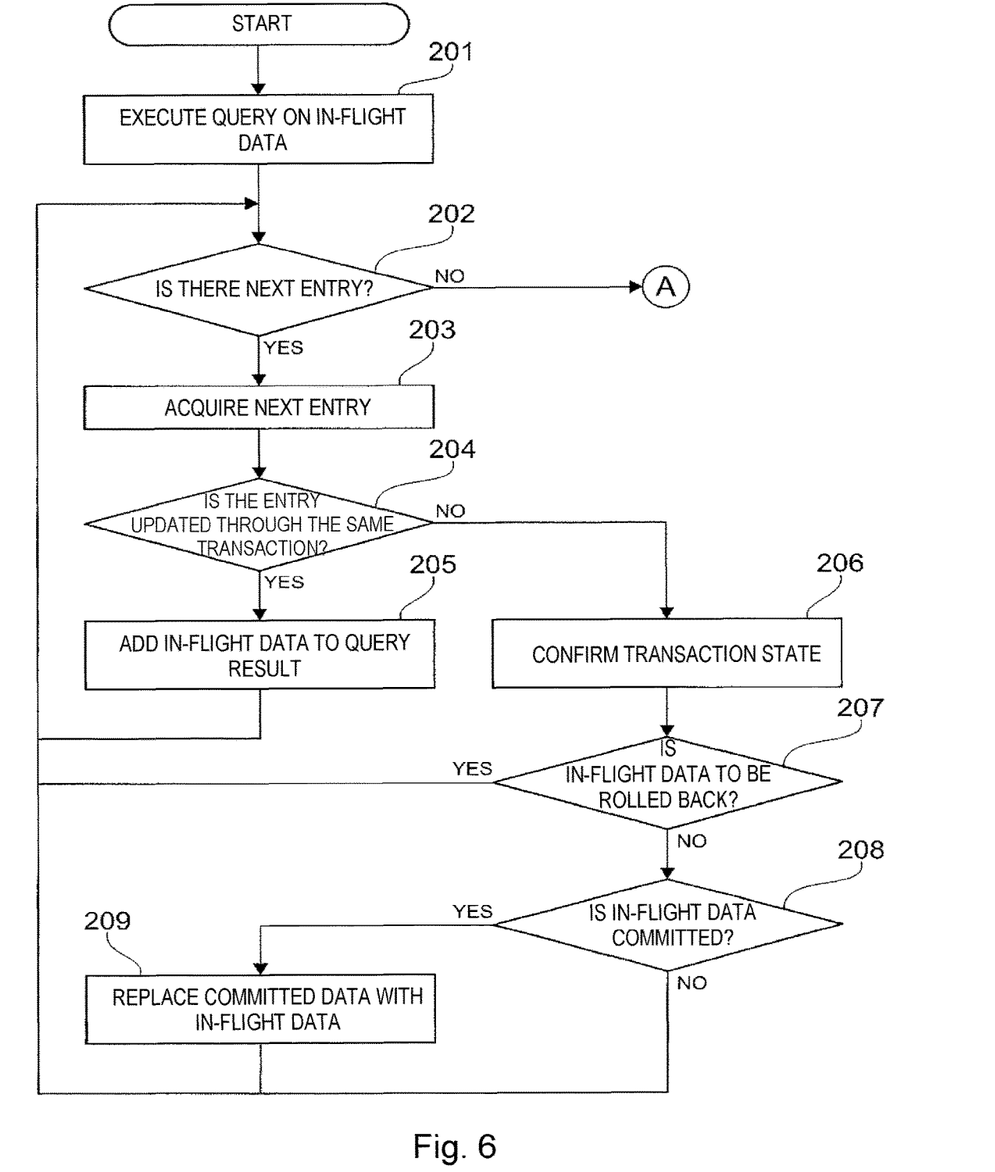
FIG. 6 is a flowchart illustrating an example of operation in the first phase of a query processing unit according to the embodiment.

FIG. 6 is a flowchart illustrating an example of operation of the first phase of query processing unit 20 according to an embodiment of the present invention. As described above, in query processing unit 20, first query executing unit 22 performs operation of the first phase. It is assumed that prior to this operation, query receiving unit 21 receives a query issued by, for example, a client. In the examples of FIGS. 2(a) to 2(f), the query {value1:{$gt:0}} is received. Query receiving unit 21 provides the received query to first query executing unit 22, thereby this operation is started.

In step 201, when the operation starts, first query executing unit 22 executes the query on the in-flight data. In the examples of FIGS. 2(a) to 2(f), first query executing unit 22 converts the query {value1:{$gt:0}} received from query receiving unit 21 into a query {_dirty.value1:{$gt:0}}. First query executing unit 22 then executes the converted query on the entry stored in data storage unit 31. At that time, first query executing unit 22 acquires a cursor for the entry.

Subsequently, in step 202, first query executing unit 22 determines whether or not this cursor has the next entry. In step 203, if it is determined that this cursor has the next entry, first query executing unit 22 acquires the next entry from data storage unit 31. In step 204, First query executing unit 22 then determines whether or not the entry is being updated by the same transaction as the transaction which is running the query. Here, the determination may be performed by comparing a transaction ID of the transaction which is running the query, held separately, with a transaction ID held in the entry.

As a result, in step 205, if it is determined that the entry is being updated by the same transaction as the transaction which is running a query, first query executing unit 22 adds the in-flight data held in the entry to the query result in query result storage unit 26, and returns the processing to step 202. In the examples of FIGS. 2(a) to 2(f), the in-flight data held in the entry 31e in FIG. 2(e) is added to the query result.

However, in step 206, if it is determined that the entry is not being updated by the same transaction as the transaction which is running the query, first query executing unit 22 confirms the transaction state for the entry. Here, this confirmation may be performed by acquiring the transaction state for the transaction ID held in the entry from transaction state storage unit 32.

In step 207, first query executing unit 22 determines whether or not the in-flight data is to be rolled back. If it is determined that the in-flight data is to be rolled back, first query executing unit 22 returns the processing to step 202 without performing further processing on the entry. In the examples of FIGS. 2(a) to 2(f), the in-flight data held in entry 31d in FIG. 2(d) is not added to the query result. Alternatively, while not illustrated in FIG. 6, first query executing unit 22 may return the processing to step 202 after performing processing of deleting the in-flight data from the entry.

On the other hand, in step 208, if it is not determined that the in-flight data is to be rolled back, first query executing unit 22 determines whether or not the in-flight data is committed. In step 209, if it is determined that the in-flight data is committed, first query executing unit 22 replaces committed data with this in-flight data and returns processing to step 202. In the examples of FIGS. 2(a) to 2(f), the in-flight data held in entry 31c in FIG. 2(c) is converted into committed data. On the other hand, if it is determined that the in-flight data is not committed, first query executing unit 22 returns the processing to step 202 without performing further processing on the entry.

Subsequently, if it is determined that the cursor does not have the next entry in step 202, the operation transitions to the second phase. Specifically, first query executing unit 22 provides the query received from query receiving unit 21 upon start of the operation of the first phase to second query executing unit 23.

Figure 7:
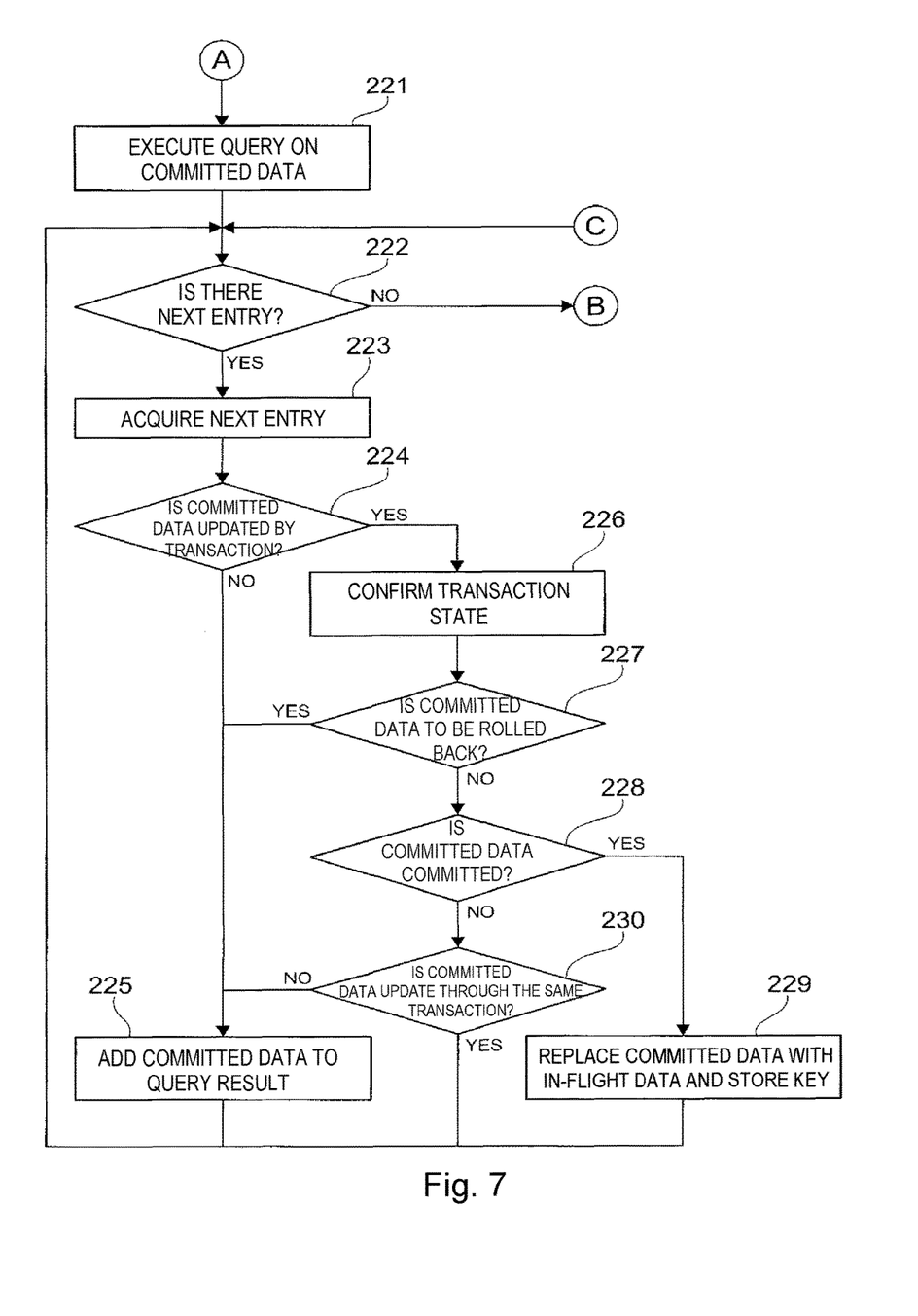
FIG. 7 is a flowchart illustrating an example of operation in the second phase of the query processing unit according to the embodiment.

FIG. 7 is a flowchart illustrating an example of operation of the second phase of query processing unit 20 according to an embodiment of the present invention. As described above, in query processing unit 20, second query executing unit 23 performs the operation of the second phase. It should be noted that this operation is started by first query executing unit 22 providing the query received from query receiving unit 21 upon start of the operation of the first phase to second query executing unit 23.

In step 221, when the operation starts, second query executing unit 23 executes the query on the committed data. In the examples of FIGS. 3(a) to 3(f), second query executing unit 23 executes the query {value1:{$gt:0}} received from query receiving unit 21 as is on the entry stored in data storage unit 31. At this time, second query executing unit 23 acquires a cursor for the entry.

Subsequently, in step 222, second query executing unit 23 determines whether or not this cursor has the next query. In step 223, if it is determined that this cursor has the next entry, the second query executing unit 23 acquires the next entry from the data storage unit 31. Then, in step 224, second query executing unit 23 determines whether or not the entry is being updated by some transaction. Here, the determination may be performed by checking whether the in-flight data is held in the entry.

As a result, in step 225, if determining that the entry is not being updated by some transaction, second query executing unit 23 adds the committed data held in the entry to the query result in the query result storage unit 26 and returns the processing to step 222. In the examples of FIGS. 3(a) to 3(f), the committed data held in entry 32c in FIG. 3(c) is added to the query result.

On the other hand, in step 226, if determining that the entry is being updated by some transaction, second query executing unit 23 confirms a transaction state for the entry. Here, the confirmation may be performed by acquiring a transaction state for the transaction ID held in the entry from transaction state storage unit 32.

In step 227, second query executing unit 23 determines whether or not the in-flight data is to be rolled back. If it is determined that the in-flight data is to be rolled back, second query executing unit 23 adds the committed data held in the entry to the query result in query result storage unit 26 as in step 225 and returns the processing to step 222. In the examples of FIGS. 3(a) to 3(f), second query executing unit 23 adds the committed data held in entry 32f in FIG. 3(f) to the query result.

In step 228, if not determining that the in-flight data is to be rolled back, second query executing unit 23 determines whether or not the in-flight data is committed. In step 229, if it is determined that the in-flight data is committed, second query executing unit 23 replaces the committed data with this in-flight data, stores a key of this entry in key storage unit 25, and returns the processing to step 222. In the examples of FIGS. 3(a) to 3(f), second query executing unit 23 converts the in-flight data held in entry 32b in FIG. 3(b) into committed data and stores key k2.

In step 230, if it is determined that the in-flight data is not committed, second query executing unit 23 determines whether or not the entry is being updated by the same transaction as the transaction which is running the query. Here, this determination may be performed by comparing a transaction ID of the transaction which is running the query, held separately, with a transaction ID held in the entry.

As a result, if determining that the entry is not being updated by the same transaction as the transaction which is running the query, second query executing unit 23 adds the committed data held in the entry to the query result in query result storage unit 26 as seen in step 225, and returns the processing to step 222. In the examples of FIGS. 3(a) to 3(f), second query executing unit 23 adds the committed data held in entry 32a in FIG. 3(a) to the query result.

On the other hand, if determining that the entry is being updated by the same transaction as the transaction which is running the query, second query executing unit 23 returns the processing to step 222 without performing further processing on the entry. In the examples of FIGS. 3(a) to 3(f), second query executing unit 23 does not add the committed data held in the entry 32e in FIG. 3(e) to the query result.

Subsequently, if it is determined that the cursor does not have the next entry in step 222, the operation transitions to the third phase. Specifically, second query executing unit 23 provides the query received from first query executing unit 22 upon start of the operation of the second phase to third query executing unit 24.

Figure 8:
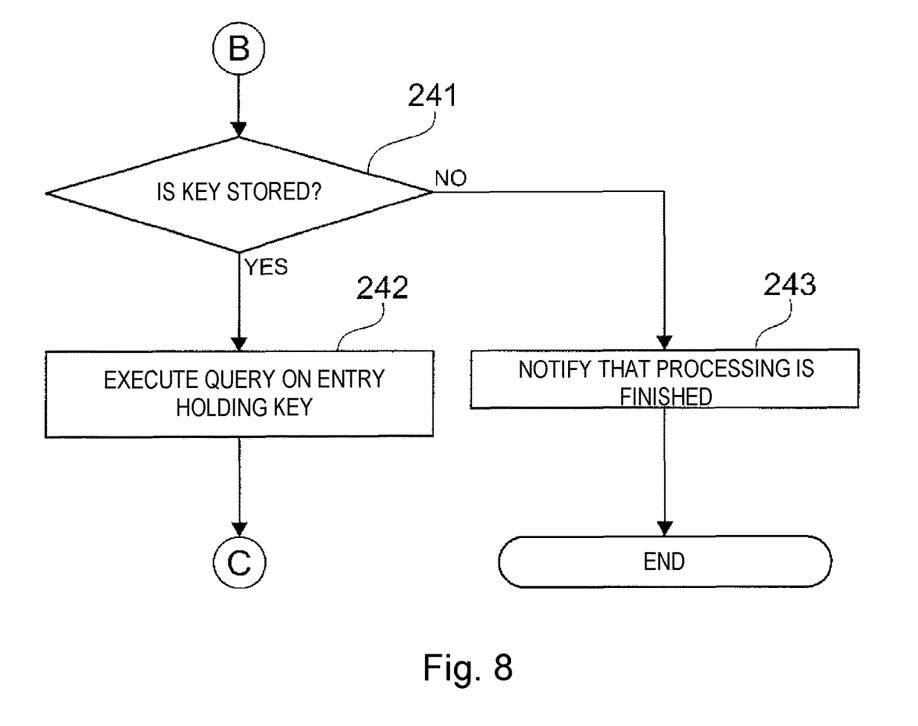
FIG. 8 is a flowchart illustrating an example of operation in the third phase of the query processing unit according to the embodiment.

FIG. 8 is a flowchart illustrating an example of operation of the third phase of query processing unit 20 according to the embodiment. As described above, in query processing unit 20, third query executing unit 24 performs the operation of the third phase. It should be noted that this operation is started by second query executing unit 23 providing the query received from first query executing unit 22 upon start of the operation of the second phase, to third query executing unit 24.

In step 241, when the operation starts, third query executing unit 24 determines whether or not a key is stored in key storage unit 25.

As a result, in step 242, if it is determined that a key is stored in key storage unit 25, third query executing unit 24 executes the query on the entry which holds the key. At this time, third query executing unit 24 acquires a cursor for the entry. Third query executing unit 24 then executes the processing of step 222 and thereafter in FIG. 7 again.

It should be noted that while in second phase description has been provided assuming that second query executing unit 23 executes the processing of step 222 and thereafter in FIG. 7. In the third phase, third query executing unit 24 executes the processing of step 222 and thereafter in FIG. 7. Further, although it is determined in the second phase that the transaction which is running the query and which generates in-flight data is committed, a determination result in step 230 in FIG. 7 is always "No", because there is no case where it is determined in the third phase that the transaction which is running the query and which generates in-flight data again is not committed.

However, in step 243, if it is determined that a key is not stored in key storage unit 25, third query executing unit 24 notifies query result output unit 27 that the processing is finished. By this means, query result output unit 27 outputs the query results stored in query result storage unit 26 until then to outside.

As described above, in an embodiment of the present invention, the query is sequentially executed on the in-flight data, the committed data and data saved as the committed data while the query is executed, in this order. By this means, for example, even if a transaction function is added to the MongoDB, it is possible to implement a query function to be provided in the transaction.

First, it becomes possible to satisfy the requirements of the transaction function for the NoSQL database. That is, while the transaction function is required to make development of application efficient, according to the embodiment, it is possible to implement the transaction function while utilizing queries of the existing application. Further, while there may be an idea that the MongoDB should not be used if ACID transaction is required, according to the embodiment, it is possible to override this idea.

Second, it becomes possible to implement all query operators on the MongoDB. Such query operators include #gt, #gte, $in, $lt, $lte, $ne, $nin, $or, $and, $not, $nor, $exists, $type, $mod, $regex, $where, $geoWithin, $geoIntersects, $near, $nearSphere, $all, $elemMatch, $size, $slice, and the like Third, it becomes possible to acquire a consistent query result with latency degrading by 11% or lower compared to latency in the case where the query is executed only on the committed data.

Further, in an embodiment of the present invention, a READ COMMITTED level is provided as an isolation level, and it becomes possible to refer to the latest data at that time.

Figure 9:
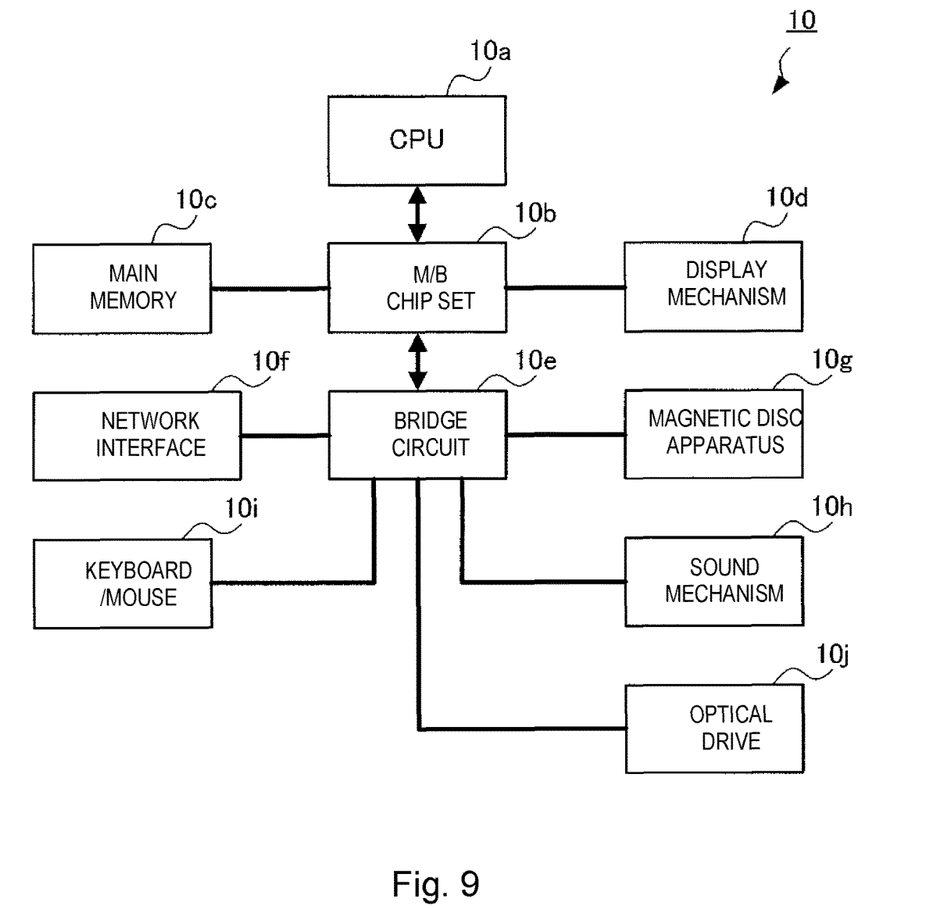
FIG. 9 illustrates an example of a hardware structure of the database apparatus according to the embodiment of the present invention.

FIG. 9 illustrates an example of a hardware structure of database apparatus 10 according to an embodiment of the present invention. In FIG. 9, database apparatus 10 includes CPU (Central Processing Unit) 10a which is a computing means, main memory 10c connected to CPU 10a via M/B (motherboard) chip set 10b, and display mechanism 10d connected to CPU 10a via M/B chip set 10b in a similar manner. Further, network interface 10f, magnetic disc apparatus (HDD) 10g, sound mechanism 10h, keyboard/mouse 10i and optical drive 10j are connected to M/B chip set 10b via bridge circuit 10e.

Further, in FIG. 9, components are connected via buses. For example, CPU 10a is connected to M/B chip set 10b, and M/B chip set 10b is connected to main memory 10c, via a CPU bus. Further, while M/B chip set 10b may be connected to display mechanism 10d via an AGP (Accelerated Graphics Port), if display mechanism 10d includes a video card supporting PCI Express, M/B chip set 10b is connected to this video card via a PCI Express (PCIe) bus. Further, among the components connected to bridge circuit 10e, network interface 10f can be connected to bridge circuit 10e using PCI Express. Further, magnetic disc apparatus 10g can be connected to the bridge circuit 10e using serial ATA (AT Attachment), ATA for parallel transfer, and a PCI (Peripheral Components Interconnect). Keyboard/mouse 10i and optical drive 10j can be connected to bridge circuit 10e using a USB (Universal Serial Bus).

The present invention can be implemented with hardware alone or with software alone. Further, the present invention can be implemented using both hardware and software. The present invention can be implemented as a computer, a data processing system and a computer program. This computer program can be stored in a computer readable medium and provided. Here, examples of the medium can include an electronic, magnetic, optical, electromagnetic, infrared or semiconductor system (apparatus or equipment), and a propagation medium. Further, examples of the computer readable medium include a semiconductor, a solid state storage apparatus, a magnetic tape, a removable computer diskette, a random access memory (RAM), a read only memory (ROM), a rigid magnetic disc, and an optical disc. Examples of the optical disc at this moment include a compact disc read only memory (CD-ROM), a compact disc read/write (CD-R/W), and a DVD.

While the present invention has been described above using an embodiment of the present invention, the technical scope of the present invention is not limited to the above-described embodiment. It will be obvious for a person skilled in the art that the present invention can be changed in various ways or alternative embodiments can be employed without departing from the spirit and the scope of the present invention.

Here, the first query executing unit may determine whether or not to include, in a result of the query, a specific unsafe element extracted using the query among the plurality of unsafe elements, based on a state of transaction relating to updating with the specific unsafe element. In this case, if the transaction is running the query, the first query executing unit may include the specific unsafe element in the result of the query, and, if the transaction is not running the query and the transaction is committed, the first query executing unit may replace a safe element to be updated by the specific unsafe element among the plurality of safe elements with the specific unsafe element.

Further, the second query executing unit may determine whether or not to include, in a result of the query, a specific safe element extracted using the query among the plurality of safe elements, based on a state of transaction relating to updating the specific safe element. In this case, if an unsafe element for updating the specific safe element is not stored, if a specific unsafe element for updating the specific safe element is stored and the transaction is aborted, or if the specific unsafe element for updating the specific safe element is stored, and the transaction is being executed and is not running the query, the second query executing unit may include the specific safe element in the result of the query, and, if the specific unsafe element for updating the specific safe element is stored and the transaction is committed, the second query executing unit may replace the specific safe element with the specific unsafe element.

Still further, the third query executing unit may determine whether or not to include, in a result of the query, a specific safe element extracted using the query among at least one safe element, based on a state of transaction relating to updating the specific safe element. In this case, if an unsafe element for updating the specific safe element is not stored, if a specific unsafe element for updating the specific safe element is stored, and the transaction is aborted, or if the specific unsafe element for updating the specific safe element is stored, and the transaction is being executed, the third query executing unit may include the specific safe element in the result of the query, and, if the specific unsafe element for updating the specific safe element is stored, and the transaction is committed, the third query executing unit may execute processing of the third query executing unit again after replacing the specific safe element with the specific unsafe element.

Yet further, the storage unit may store, in association with each unsafe element of the plurality of unsafe elements, a transaction ID for identifying transaction which executes updating with the unsafe element. In this case, the storage unit may store each safe element of the plurality of safe elements, the unsafe element and a transaction ID as one entry. Further, the storage unit may store transaction state information indicating a state of the transaction in association with a transaction ID. The first query executing unit, the second query executing unit and the third query executing unit execute processing with reference to the transaction state information using a transaction ID in an entry including a data element extracted using the query. If an unsafe element associated with the safe element extracted using the query in the entry has been updated through the committed transaction, the second query executing unit may replace the safe element with the unsafe element and store a key relating to the entry, and the third query executing unit may execute the query using the key.

What is claimed is:

1. An apparatus for processing a query for a NoSQL database, the apparatus comprising:
   a storage unit configured to store (i) a plurality of safe elements committed and saved in the database, and (ii) a plurality of unsafe elements for updating the plurality of safe elements, wherein the unsafe elements are not committed or committed, but not saved as committed data;
   a first query executing unit configured to execute the query on the plurality of unsafe elements, wherein the first query executing unit determines whether or not to include a specific unsafe element extracted using the query among the plurality of unsafe elements in a result of the query based on a state of transaction relating to updating with the specific unsafe element;
   a second query executing unit configured to execute the query on the plurality of safe elements after the first query executing unit executes the query, wherein the second query executing unit determines whether or not to include a specific safe element extracted using the query among the plurality of safe elements in a result of the query based on a state of transaction relating to updating the specific safe element; and
   a third query executing unit configured to execute the query on at least one safe element saved during execution of the query by the second query executing unit after the second query executing unit executes the query, wherein the third query executing unit determines whether or not to include a specific safe element extracted using the query among the at least one safe element in a result of the query based on a state of transaction relating to updating the specific safe element.

2. The apparatus according to claim 1, wherein the first query executing unit includes the specific unsafe element in the result of the query if the transaction is running the query.

3. The apparatus according to claim 1, wherein the first query executing unit replaces a safe element to be updated by the specific unsafe element among the plurality of safe elements with the specific unsafe element if the transaction is not running the query, and the transaction is committed.

4. The apparatus according to claim 1, wherein the second query executing unit includes the specific safe element in the result of the query if: an unsafe element for updating the specific safe element is not stored; a specific unsafe element for updating the specific safe element is stored and the transaction is aborted; or a specific unsafe element for updating the specific safe element is stored, and the transaction is being executed and is not running the query.

5. The apparatus according to claim 1, wherein the second query executing unit replaces the specific safe element with the specific unsafe element if a specific unsafe element for updating the specific safe element is stored, and the transaction is committed.

6. The apparatus according to claim 5, wherein the third query executing unit includes the specific safe element in the result of the query if: an unsafe element for updating the specific safe element is not stored; a specific unsafe element for updating the specific safe element is stored, and the transaction is aborted; or a specific unsafe element for updating the specific safe element is stored, and the transaction is being executed.

7. The apparatus according to claim 5, wherein the third query executing unit executes processing of the third query executing unit again after replacing the specific safe element with the specific unsafe element if a specific unsafe element for updating the specific safe element is stored, and the transaction is committed.

8. The apparatus according to claim 1, wherein the storage unit stores a transaction ID for identifying transaction executing updating with the unsafe element in association with each unsafe element of the plurality of unsafe elements.

9. The apparatus according to claim 7, wherein the storage unit stores each safe element of the plurality of safe elements, the unsafe element, and the transaction ID as one entry.

10. The apparatus according to claim 8, wherein the storage unit stores transaction state information indicating the state of the transaction in association with the transaction ID.

11. The apparatus according to claim 9, wherein the first query executing unit, the second query executing unit, and the third query executing unit each execute processing while referring to the transaction state information using the transaction ID in the entry including a data element extracted using the query.

12. The apparatus according to claim 10, wherein the second query executing unit replaces a safe element with an unsafe element and stores a key relating to the entry and the third query executing unit executes the query using the key if the unsafe element in the entry is associated with the safe element extracted using the query has been updated through a committed transaction.

* * * * *